United States Patent
Ono (10) Patent No.: US 10,737,681 B2
(45) Date of Patent: Aug. 11, 2020

(54) DRIVE UNIT, VEHICLE, AND CONTROL METHOD FOR DRIVE UNIT

(71) Applicant: DENSO CORPORATION, Kariya (JP)

(72) Inventor: Toshikazu Ono, Toyota (JP)

(73) Assignee: DENSO CORPORATION, Kariya, Aichi-Pref (JP)

(*) Notice: Subject to any disclaimer, the term of this patent is extended or adjusted under 35 U.S.C. 154(b) by 410 days.

(21) Appl. No.: 15/852,298

(22) Filed: Dec. 22, 2017

(65) Prior Publication Data

US 2018/0178775 A1 Jun. 28, 2018

(30) Foreign Application Priority Data

Dec. 27, 2016 (JP) ................... 2016-253608

(51) Int. Cl.
| | |
|---|---|
| *B60W 20/10* | (2016.01) |
| *H01M 10/44* | (2006.01) |
| *B60L 3/00* | (2019.01) |
| *B60L 15/00* | (2006.01) |
| *B60L 1/00* | (2006.01) |
| *B60L 3/04* | (2006.01) |

(Continued)

(52) U.S. Cl.
CPC ............. *B60W 20/10* (2013.01); *B60L 1/003* (2013.01); *B60L 3/0007* (2013.01); *B60L 3/0061* (2013.01); *B60L 3/0069* (2013.01); *B60L 3/04* (2013.01); *B60L 15/007* (2013.01); *B60L 58/12* (2019.02); *B60L 58/20* (2019.02); *H01M 10/44* (2013.01); *B60L 2210/10* (2013.01); *B60L 2210/12* (2013.01); *B60L 2210/14* (2013.01); *B60L 2240/527* (2013.01); *B60L 2240/80* (2013.01); *B60W 2510/244* (2013.01); *H01M 2220/20* (2013.01); *Y02T 10/645* (2013.01); *Y02T 10/7005* (2013.01); *Y02T 10/7066* (2013.01); *Y02T 10/7225* (2013.01); *Y02T 10/7233* (2013.01)

(58) Field of Classification Search
CPC ..... B60W 20/10; H01M 10/44; B60L 15/007; B60L 3/0007
USPC ................................. 320/134–136
See application file for complete search history.

(56) References Cited

U.S. PATENT DOCUMENTS

| | | | |
|---|---|---|---|
| 8,926,174 B2* | 1/2015 | Kawamura | ............. H01L 23/36 374/163 |
| 9,950,627 B2* | 4/2018 | Yaegaki | ................ H02M 3/155 |
| 2010/0296204 A1 | 11/2010 | Ichikawa et al. | |

(Continued)

FOREIGN PATENT DOCUMENTS

| | | |
|---|---|---|
| EP | 2 431 211 A1 | 3/2012 |
| JP | 2011-010406 A | 1/2011 |

(Continued)

*Primary Examiner* — Richard V Muralidar
(74) *Attorney, Agent, or Firm* — Finnegan, Henderson, Farabow, Garrett & Dunner, LLP (57) ABSTRACT

In a drive unit including a motor, an inverter, a first electric storage device, a step up-down converter, first and second capacitors, a DC-DC converter, and a relay, the DC-DC converter is driven, while a target duty ratio of the step up-down converter is set such that a total loss of the step up-down converter and the DC-DC converter becomes larger than a maximum loss value of the step up-down converter, and the step up-down converter is controlled, when the relay is turned off to discharge charge of the first capacitor and the second capacitor.

11 Claims, 6 Drawing Sheets

(51) Int. Cl.
*B60L 58/20* (2019.01)
*B60L 58/12* (2019.01)

(56) References Cited

U.S. PATENT DOCUMENTS

| | | |
|---|---|---|
| 2011/0133547 A1 | 6/2011 | Song et al. |
| 2012/0055727 A1 | 3/2012 | Omiya et al. |
| 2015/0108929 A1* | 4/2015 | Nobe .................. H02P 6/085 |
| | | 318/400.3 |
| 2016/0280076 A1 | 9/2016 | Yaegaki et al. |

FOREIGN PATENT DOCUMENTS

| | | |
|---|---|---|
| JP | 2011-036048 A | 2/2011 |
| JP | 2011-259517 A | 12/2011 |
| JP | 2015-19561 | 1/2015 |
| JP | 2017-70007 | 4/2017 |
| WO | WO 201 0/1 31 34 | 11/2010 |
| WO | WO 2015/068533 A1 | 5/2015 |

\* cited by examiner

DRIVE UNIT, VEHICLE, AND CONTROL METHOD FOR DRIVE UNIT

INCORPORATION BY REFERENCE

The disclosure of Japanese Patent Application No. 2016-253608 filed on Dec. 27, 2016 including the specification, drawings and abstract is incorporated herein by reference in its entirety.

BACKGROUND

1. Technical Field

The present disclosure relates to a drive unit, a vehicle, and a control method for the drive unit.

2. Description of Related Art

A drive unit has been proposed which includes a motor-generator, an inverter, a high-voltage electric storage device, a step up-down converter, first and second capacitors, a DC-DC converter, and a relay (see, for example, International Publication No. WO2010/131340). Here, the inverter is used for driving the motor. The step up-down converter has a switching element and a reactor. The step up-down converter is connected to a first electric power line and a second electric power line, the first electric power line being connected to the inverter, the second electric power line being connected to the high-voltage electric storage device. The step up-down converter is configured to exchange electric power between the first electric power line and the second electric power line while converting the voltage of the electric power. The first capacitor is attached to the first electric power line, and the second capacitor is attached to the second electric power line. The DC-DC converter is connected to the second electric power line. The relay is provided in a portion of the second electric power line closer to the high pressure electric storage device than the DC-DC converter. In the drive unit, when a wire connected to the motor-generator is disconnected, the relay is turned off to discharge residual charge of the first and second capacitors. In that case, the switching element of the step up-down converter is controlled such that the step up and down converter repeats step-up operation and step-down operation. Accordingly, energy loss is caused in the reactor, and switching loss is caused in the switching element, so that the charge of the first capacitor is consumed during the step-up operation, and the charge of the second capacitor is consumed during the step-down operation.

SUMMARY

For discharging the residual charge of the first capacitor and the second capacitor in such a drive unit, it is requested to shorten the time taken for discharging (time until the voltage of the first capacitor and the second capacitor reaches a threshold value or below). To answer the request, how to control the step up-down converter (step-up operation and step-down operation) is an issue.

The drive unit, the vehicle, and the control method for the drive unit in the present disclosure shorten the time taken for discharging the charge of the first capacitor and the second capacitor.

The drive unit, the vehicle, and the control method for the drive unit in the present disclosure adopts the following means to achieve the above main object.

A first aspect of the present disclosure is a drive unit. The drive units includes: a motor; an inverter that drives the motor; a first electric storage device; a step up-down converter having a switching element and a reactor, the step up-down converter being connected to a first electric power line and a second electric power line, the first electric power line being connected to the inverter, the second electric power line being connected to the first electric storage device, the step up-down converter being configured to exchange electric power between the second electric power line and the first electric power line while converting voltage of the electric power; a first capacitor attached to the first electric power line; a second capacitor attached to the second electric power line; a DC-DC converter connected to the first electric power line; a relay provided in a portion of the second electric power line closer to the first electric storage device than the second capacitor; and an electronic control unit configured to control the step up-down converter and the DC-DC converter. The electronic control unit is configured to execute a first discharge control when the relay is turned off to discharge charge of the first capacitor and the second capacitor, the first discharge control being a control to drive the DC-DC converter, while setting a target duty ratio of the step up-down converter such that a total loss of the step up-down converter and the DC-DC converter becomes larger than a maximum loss value of the step up-down converter, and controlling the step up-down converter.

With the configuration, the first discharge control is executed when the relay is turned off to discharge the charge of the first capacitor and the second capacitor, the first discharge control being configured to drive the DC-DC converter, while setting a target duty ratio of the step up-down converter such that a total loss of the step up-down converter and the DC-DC converter becomes larger than a maximum loss value of the step up-down converter, and controlling the step up-down converter. Therefore, as compared with the configuration of setting the target duty ratio without taking the total loss into consideration (for example, setting the target duty ratio as a uniform value) and controlling the step up-down converter, the time taken for discharging the charge of the first capacitor and the second capacitor (time until the voltage of the first capacitor and the second capacitor reaches a threshold value or below) can be shortened.

In the driving unit, the electronic control unit may be configured to set the target duty ratio such that the total loss is maximized when the first discharge control is executed. With the configuration, the time taken for discharging the charge of the first capacitor and the second capacitor can be shortened more.

The drive unit may further include a second electric storage device having a rated voltage lower than that of the first electric storage device, the second electric storage device being capable of supplying electric power for operation to the electronic control unit. The DC-DC converter may be configured to step down voltage of electric power of the first electric power line and supply the electric power to the electronic control unit as the electric power for operation. The electronic control unit may be configured to execute the first discharge control irrespective of whether or not the electric power for operation from the second electric storage device to the electronic control unit is suppliable when the relay is turned off to discharge the charge of the first capacitor and the second capacitor. With the configuration, the first discharge control is executed irrespective of whether or not the electric power for operation from the second electric storage device to the electronic control unit is suppliable. Accordingly, the electric power for operation from the first electric power line to the electronic control unit through the DC-DC converter can be supplied, which makes it possible to secure an operating state of the electronic control unit, and to discharge the charge of the first capacitor and the second capacitor.

The drive unit may further include a second electric storage device having a rated voltage lower than that of the first electric storage device, the second electric storage device being capable of supplying electric power for operation to the electronic control unit. The DC-DC converter may be configured to step down voltage of electric power of the first electric power line and supply the electric power to the electronic control unit as the electric power for operation. The electronic control unit may execute the first discharge control when following conditions i) and ii) are both satisfied, i) the relay is turned off to discharge the charge of the first capacitor and the second capacitor, and ii) the electronic control unit determines that the electric power for operation from the second electric storage device to the electronic control unit is not suppliable. The electronic control unit may be configured to executed a second discharge control when following conditions i) and iii) are both satisfied, i) The relay is turned off to discharge the charge of the first capacitor and the second capacitor, and iii) the electronic control unit determines that the electric power for operation from the second electric storage device to the electronic control unit is suppliable. The second discharge control may be a control to set the target duty ratio based on the loss of the step up-down converter and control the step up-down converter. With the configuration, when the electric power for operation from the second electric storage device to the electronic control unit is not suppliable, the first discharge control is executed. Accordingly, the electric power for operation from the first electric power line to the electronic control unit through the DC-DC converter is supplied, which makes it possible to secure the operating state of the electronic control unit, and to discharge the charge of the first capacitor and the second capacitor. When the electric power for operation from the second electric storage device to the electronic control unit is 6 suppliable, the electric power for operation from the second electric power line to the electronic control unit is supplied, so that the operating state of the electronic control unit can be secured. Accordingly, the second discharge control is executed, so that the charge of the first capacitor and the second capacitor can be discharged. In the latter case in particular, when the target duty ratio is set to increase the loss of the step up-down converter, and the step up-down converter is controlled, the time taken for discharging the charge of the first capacitor and the second capacitor can be shortened as compared with the configuration of setting the target duty ratio without taking the total loss into consideration (for example, setting the target duty ratio as a uniform value) and controlling the step up-down converter.

In the drive unit, the electronic control unit may be configured to determine that the electric power for operation from the second electric storage device to the electronic control unit is not suppliable, when following conditions i) and iv) are both satisfied, i) the relay is turned off to discharge charge of the first capacitor and the second capacitor, and iv) the electronic control unit determines that abnormality occurs in the second electric storage device. With the configuration, when abnormality occurs in the second electric storage device, the first discharge control may be executed. This makes it possible to secure the operation state of the electronic control unit, and to discharge the charge of the first capacitor and the second capacitor.

In the driving unit, the electronic control unit may be configured to set the target duty ratio such that the loss of the step up-down converter is maximized when executing the second discharge control. With the configuration, the second discharge control is executed, so that the time taken for discharging the charge of the first capacitor and the second capacitor can be shortened.

In the drive unit, the DC-DC converter may be configured to switch first electric power supply and second electric power supply, the first electric power supply being configured to step down voltage of electric power of the second electric power line and supply the electric power to a third electric power line connected to the second electric storage device, the electronic control unit, and a plurality of auxiliary machines, the second electric power supply being configured to step down voltage of electric power of the first electric power line and supply the electric power to the electronic control unit as the electric power for operation. The electronic control unit may execute the second electric power supply with the DC-DC converter when executing the first discharge control. The electronic control unit may execute the first electric power supply with the DC-DC converter when executing the second discharge control. The electronic control unit may be configured to execute the first discharge control when following conditions i), v), and vi) are all satisfied, i) the relay is turned off to discharge the charge of the first capacitor and the second capacitor, v) the electronic control unit determines that electric power is suppliable from the second electric storage device to the electronic control unit, and vi) total electric power consumption of the plurality of auxiliary machines is equal to or below a threshold value. The electronic control unit may be configured to execute the second discharge control when following conditions i), v), and vii) are all satisfied, i) the relay is turned off to discharge charge of the first capacitor and the second capacitor, v) the electronic control unit determines that electric power from the second electric storage device to the electronic control unit is suppliable, and vii) the total electric power consumption of the plurality of auxiliary machines is larger than the threshold value. With the configuration, when the total electric power consumption of the plurality of auxiliary machines is relatively large, it is necessary to supply relatively large electric power from the second electric power line to the third electric power line with the DC-DC converter. Accordingly, when the second discharge control is executed, the time taken for discharging the first capacitor and the second capacitor can be shortened more than when the first discharge control is executed. When the total electric power consumption of the plurality of auxiliary machines is not so large, it is not necessary to supply such large electric power from the second electric power line to the third electric power line with the DC-DC converter. Accordingly, when the first discharge control is executed, the time taken for discharging the first capacitor and the second capacitor can be shortened more than when the second discharge control is executed. Therefore, the time taken for discharging the first capacitor and the second capacitor can be shortened more by executing the first discharge control or the second discharge control depending on the total electric power consumption of the plurality of auxiliary machines.

In the drive unit, the electronic control unit may be configured to store a predetermined relation between voltage of the second electric power line and the target duty ratio that maximizes the total loss. The electronic control unit is configured to set the target duty ratio by applying the voltage of the second electric power line to the relation when the first discharge control is executed. With the configuration, the target duty ratio corresponding to the voltage of the second electric power line can be set using the predetermined relation.

In the drive unit, the electronic control unit may be configured to define a total ripple of a current ripple of the step up-down converter and a current ripple of the DC-DC converter as the total loss, and set the target duty ratio such that the total loss approximates to the maximum when the first discharge control is executed. With the configuration, the target duty ratio can be set to maximize the total loss using the total ripple.

A second aspect of the present disclosure is a vehicle. The vehicle includes: a motor, an inverter that drives the motor, a first electric storage device; a step up-down converter having a switching element and a reactor, the step up-down converter being connected to a first electric power line and a second electric power line, the first electric power line being connected to the inverter, the second electric power line being connected to the first electric storage device, the step up-down converter being configured to exchange electric power between the second electric power line and the first electric power line while converting voltage of the electric power, a first capacitor attached to the first electric power line; a second capacitor attached to the second electric power line; a DC-DC converter connected to the first electric power line; a relay provided in a portion of the second electric power line closer to the first electric storage device than the second capacitor; and an electronic control unit configured to control the step up-down converter and the DC-DC converter. The electronic control unit is configured to execute a first discharge control when the relay is turned off to discharge the charge of the first capacitor and the second, the first control being configured to drive the DC-DC converter, while setting a target duty ratio of the step up-down converter such that a total loss of the step up-down converter and the DC-DC converter becomes larger than a maximum loss value of the step up-down converter, and controlling the step up-down converter. The electronic control unit is configured to execute the first discharge control when detecting a collision of the vehicle.

With the configuration, the vehicle incorporates the drive unit according to any one of the aspects of the present disclosure, the vehicle being configured to execute the first discharge control when detecting a collision of the vehicle. Accordingly, when detecting the collision of the vehicle, the vehicle can demonstrate an effect similar to the effect demonstrated by the aforementioned drive unit, for example, the effect of being able to shorten the time taken for discharging the charge of the first capacitor and the second capacitor.

A third aspect of the present disclosure is a control method for a drive unit. The drive unit includes: a motor, an inverter that drives the motor; a first electric storage device; a step up-down converter having a switching element and a reactor, the step up-down converter being connected to a first electric power line and a second electric power line, the first electric power line being connected to the inverter, the second electric power line being connected to the first electric storage device, the step up-down converter being configured to exchange electric power between the second electric power line and the first electric power line while converting voltage of the electric power, a first capacitor attached to the first electric power line; a second capacitor attached to the second electric power line; a DC-DC converter connected to the first electric power line; a relay provided in a portion of the second electric power line closer to the first electric storage device than the second capacitor; and an electronic control unit configured to control the step up-down converter and the DC-DC converter. The control method includes executing, by the electronic control unit, a first discharge control by the electronic control unit when the relay is turned off to discharge charge of the first capacitor and the second capacitor, the first discharge control being configured to drive the DC-DC converter with the electronic control unit, while setting a target duty ratio of the step up-down converter such that a total loss of the step up-down converter and the DC-DC converter becomes larger than a maximum loss value of the step up-down converter, and controlling the step up-down converter.

With the configuration, the first discharge control is executed when the relay is turned off to discharge the charge of the first capacitor and the second capacitor, the first discharge control being configured to drive the DC-DC converter, while setting a target duty ratio of the step up-down converter such that a total loss of the step up-down converter and the DC-DC converter becomes larger than a maximum loss value of the step up-down converter, and controlling the step up-down converter. Therefore, as compared with the configuration of setting the target duty ratio without taking the total loss into consideration (for example, by setting the target duty ratio as a uniform value) and controlling the step up-down converter, the time taken for discharging the charge of the first capacitor and the second (time until the voltage of the first capacitor and the second capacitor reaches a threshold value or below) can be shortened.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Now, modes for carrying out the present disclosure will be described in detail based on embodiments.

Figure 1:
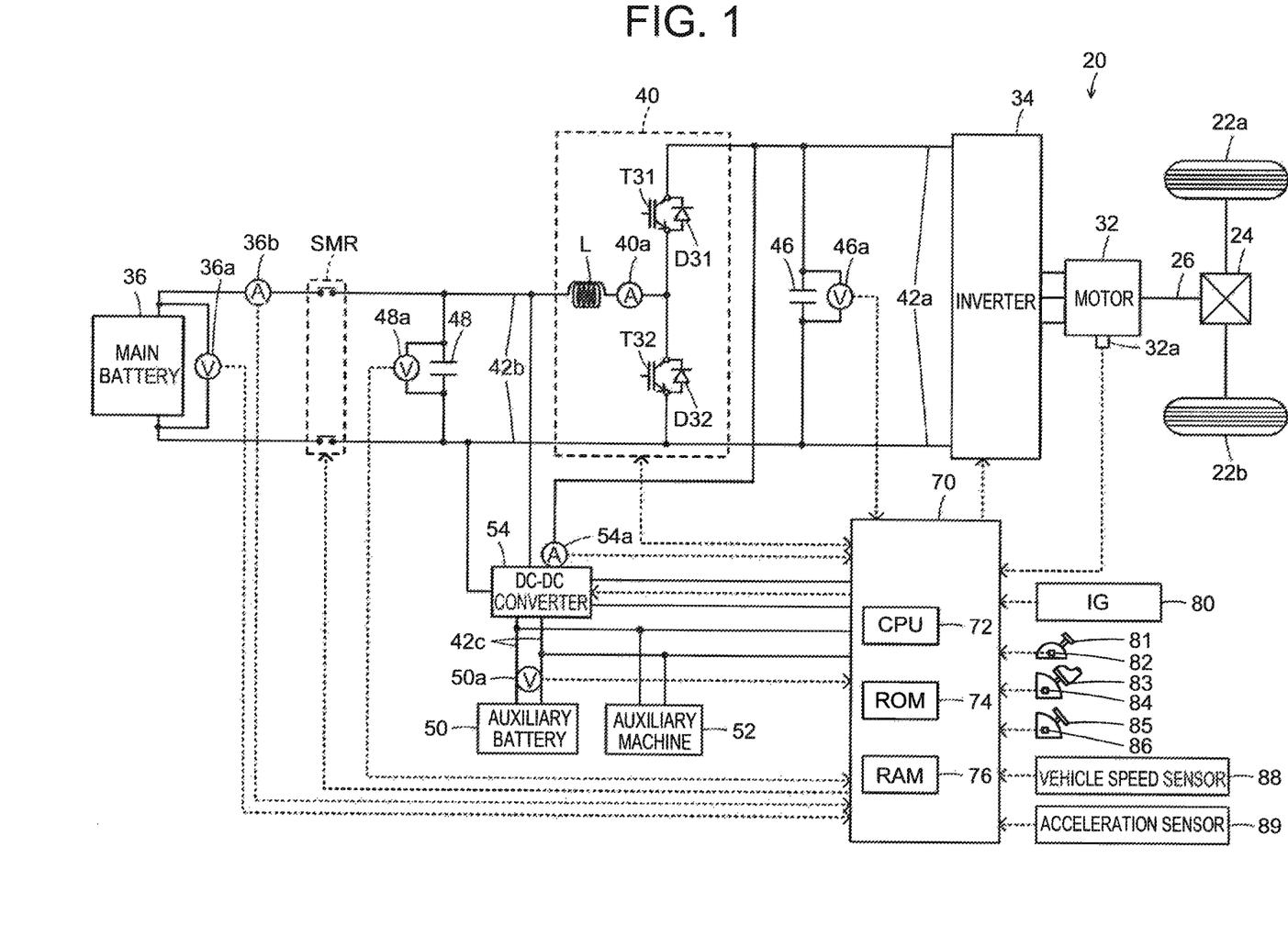
FIG. 1 is a block diagram illustrating an outlined configuration of an electric vehicle 20 incorporating a drive unit as one embodiment of the present disclosure.

FIG. 1 is a block diagram illustrating an outlined configuration of an electric vehicle 20 incorporating a drive unit as one embodiment of the present disclosure. As illustrated in the drawing, the electric vehicle 20 of the embodiment includes a motor 32, an inverter 34, a main battery 36 as the first electric storage device, a step up-down converter 40, capacitors 46, 48, an auxiliary battery 50 as a second electric storage device, a DC-DC converter 54, a system main relay SMR, and an electronic control unit 70.

The motor 32 is configured as a synchronous generator-motor, including a rotator with a permanent magnet embedded therein, and a stator with a three-phase coil wound therearound. The rotator of the motor 32 is connected to a driving shaft 26 coupled with front wheels 22a, 22b through a differential gear 24. The inverter 34 is connected to the motor 32 and is also connected to a high-voltage system electric power line 42a as the first electric power line. The motor 32 is rotationally driven when the electronic control unit 70 controls switching of a plurality of unillustrated switching elements of the inverter 34 while voltage is applied to the high-voltage system electric power line 42a. For example, the main battery 36 is configured as a lithium-ion secondary battery or a nickel-hydrogen secondary battery having such a rated voltage as 200 V or 250 V. The main battery 36 is connected to a low-voltage system electric power line 42b as the second electric power line.

The step up-down converter 40 is connected to the high-voltage system electric power line 42a and the low-voltage system electric power line 42b. The step up-down converter 40 has two transistors T31, T32, two diodes D31, D32 connected in parallel to the transistors T31, T32, and a reactor L. The transistor T31 is connected to a positive electrode-side line of the high-voltage system electric power line 42a. The transistor T32 is connected to the transistor T31, a negative electrode-side line of the high-voltage system electric power line 42a, and a negative electrode-side line of the low-voltage system electric power line 42b. The reactor L is connected to a junction point between the transistor T31 and the transistor T32 and to a positive electrode-side line of the low-voltage system electric power line 42b. A ratio of turn-on time of the transistors T31, T32 is regulated by the electronic control unit 70. In accordance with the regulation, the first step up-down converter 40 steps up the voltage of electric power of the low-voltage system electric power line 42b and supplies the electric power to the high-voltage system electric power line 42a, or steps down the voltage of electric power of the high-voltage system electric power line 42a and supplies the electric power to the low-voltage system electric power line 42b. The capacitor 46 is attached to the positive electrode-side line and the negative electrode-side line of the high-voltage system electric power line 42a. The capacitor 48 is attached to the positive electrode-side line and the negative electrode-side line of the low-voltage system electric power line 42b.

For example, the auxiliary battery 50 is configured as a lead storage battery having such a rated voltage as 12 V and 14 V. The auxiliary battery 50 is connected to an auxiliary-system electric power line 42c as the third electric power line. The auxiliary-system electric power line 42c is connected not only to the auxiliary battery 50 but also to the plurality of auxiliary machines 52, such as a headlight, a room light, an audio system, an automatic window, and a seat heater, and to the electronic control unit 70.

The DC-DC converter 54 is configured to be able to switch first electric power supply and second electric power supply. The first electric power supply is for stepping down the voltage of electric power of the low-voltage system electric power line 42b and supply the electric power to the auxiliary-system electric power line 42c. The second electric power supply is for stepping down the voltage of electric power of the high-voltage system electric power line 42a and supply the electric power to the electronic control unit 70 as electric power for operation. The DC-DC converter 54 basically perform the first electric power supply. The DC-DC converter 54 is controlled by the electronic control unit 70.

The system main relay SMR is provided in a portion the low-voltage system electric power line 42b closer to the main battery 36 side than the capacitor 48. The system main relay SMR connects and disconnects between the main battery 36 and the capacitor 48 side when on-off control of the system main relay SMR is performed by the electronic control unit 70.

The electronic control unit 70 is configured as a microprocessor having a CPU 72 as a main component. The electronic control unit 70 includes a ROM 74 that stores data such as processing programs and various maps, a RAM 76 that temporarily stores data, and input and output ports in addition to the CPU 72. The electronic control unit 70 receives signals from various sensors through the input port. Examples of the signals input in the electronic control unit 70 may include a rotational position θm from a rotational position detection sensor 32a that detects the rotational position of the rotator of the motor 32, and phase currents Iu, Iv of the motor 32 from a current sensor that detects an electric current flowing in respective phases. The examples of the signals may also include a voltage Vmb of the main battery 36 from a voltage sensor 36a attached across the terminals of the main battery 36, and an electric current Imb of the main battery 36 from a current sensor 36b attached to an output terminal of the main battery 36. The examples of the signals may further include a voltage VH of the capacitor 46 (high-voltage system electric power line 42a) from a voltage sensor 46a attached across the terminals of the capacitor 46, a voltage VL of the capacitor 48 (low-voltage system electric power line 42b) from a voltage sensor 48a attached across the terminals of the capacitor 48, and an electric current IL of the reactor L from a current sensor 40a that detects the electric current flowing through the reactor L of the step up-down converter 40. In addition, the examples of the signals may also include a voltage Vhb of the auxiliary battery 50 from a voltage sensor 50a attached across the terminals of the auxiliary battery 50, and an electric current Idc of the DC-DC converter 54 from a current sensor 54a that detects an input current of the DC-DC converter 54 when the DC-DC converter 54 performs the second electric power supply. The examples of the signals may also include an ignition signal from an ignition switch 80, and a shift position SP from a shift position sensor 82 that detects an operative position of a shift lever 81. The examples of the signals may also include an accelerator operation amount Acc from an accelerator pedal position sensor 84 that detects a stepping-in amount of an accelerator pedal 83, a brake pedal position BP from a brake pedal position sensor 86 that detects the stepping-in amount of the brake pedal 85, a vehicle speed V from a vehicle speed sensor 88, and a vehicle body acceleration α from an acceleration sensor 89. The electronic control unit 70 outputs various control signals through the output port. For example, the signals input into the electronic control unit 70 may include switching control signals to a plurality of unillustrated switching elements of the inverter 34, switching control signals to the transistors T31, T32 of the step up-down converter 40, and a control signal to the DC-DC converter 54. The electronic control unit 70 calculates an electrical angle θe and a number of rotations Nm of the motor 32 based on the rotational position θm of the rotor of the motor 32 from the rotational position detection sensor 32*a*. The electronic control unit 70 also calculates a state of charge SOC of the main battery 36 based on an integrated value of the current Imb of the main battery 36 from the current sensor 36*b*. Here, the state of charge SOC refers to a ratio of the capacity of electric power dischargeable from the main battery 36 to the total capacity of the main battery 36.

In the thus-configured electric vehicle 20 of the embodiment, the electronic control unit 70 performs following traveling control. In the traveling control, a request torque Td* requested to the driving shaft 26 is set based on the accelerator operation amount Acc and the vehicle speed V. The set request torque Td* is set as a torque command Tm* for the motor 32. Switching control of the plurality of switching elements of the inverter 34 is performed such that the motor 32 is driven with the torque command Tm*. A target voltage VH* of the high-voltage system electric power line 42*a* is also set such that the motor 32 can be driven at a target operating point (torque command Tm* and number of rotations Nm). Switching control of the transistors T31, T32 of the step up-down converter 40 is performed such that the voltage VH of the high-voltage system electric power line 42*a* becomes a target voltage VH*. Furthermore, the DC-DC converter 54 is controlled such that the first electric power supply is performed by the DC-DC converter 54.

Figure 2:
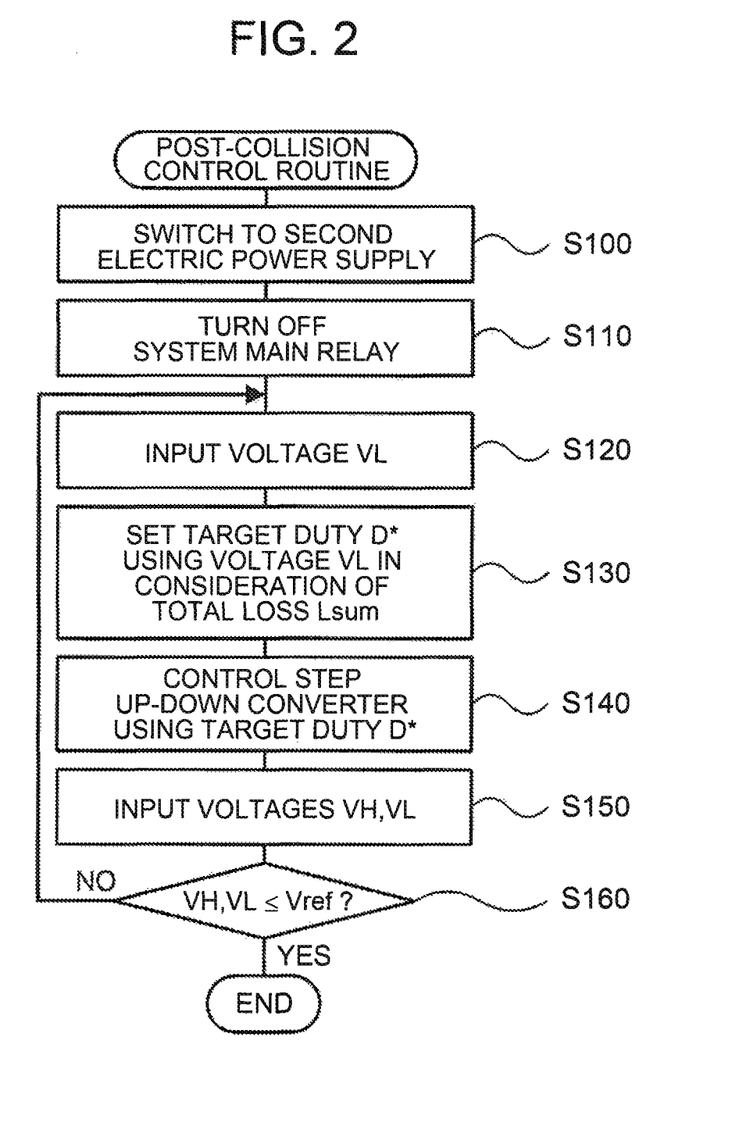
FIG. 2 is a flowchart illustrating one example of a post-collision control routine executed by an electronic control unit 70.

A description is now given of the operation of the thus-configured electric vehicle 20 of the embodiment, and more particularly the operation when a collision of the vehicle is detected with the electronic control unit 70. FIG. 2 is a flowchart illustrating one example of a post-collision control routine executed by the electronic control unit 70. The routine is executed when a collision of the vehicle is detected. In the embodiment, the electronic control unit 70 detects the collision of the vehicle, when a vehicle body acceleration α detected by the acceleration sensor 89 reaches below a negative threshold value αref for collision determination.

When the post-collision control routine of FIG. 2 is executed, the electronic control unit 70 switches electric power supply by the DC-DC converter 54 from the first electric power supply to the second electric power supply (step S100), and turns off the system main relay SMR (step S110). When the vehicle collides, abnormality may occur in the auxiliary battery 50, which may makes it impossible to supply the electric power for operation from the auxiliary battery 50 to the electronic control unit 70. In the embodiment, electric power supply by the DC-DC converter 54 is switched from the first electric power supply to the second electric power supply at the moment when the collision of the vehicle is detected (before the electronic control unit 70 is shut down). Accordingly, even when it becomes impossible to supply the electric power for operation from the auxiliary battery 50 to the electronic control unit 70, the electric power for operation can be supplied to the electronic control unit 70 from the high-voltage system electric power line 42*a* through the DC-DC converter 54. As a result, an operating state of the electronic control unit 70 can be secured. By executing the second electric power supply, the DC-DC converter 54 can secure operating voltage of the electronic control unit 70 more reliably as compared with the case of stepping down the voltage of electric power of the low-voltage system electric power line 42*b* and supplying the electric power to the electronic control unit 70 as the electric power for operation.

Next, the voltage VL of the capacitor 48 (low-voltage system electric power line 42*b*) is input from the voltage sensor 48*a* (step S120). Based on the input voltage VL of the low-voltage system electric power line 42*b*, a target duty ratio D* of the step up-down converter 40 is set in consideration of a total loss Lsum of a loss Ldc of the step up-down converter 40 and a loss Lco of the DC-DC converter 54 generated when the DC-DC converter 54 performs the second electric power supply (step S130). Then, switching control of the transistors T31, T32 in the step up-down converter 40 is performed using the set target duty ratio D* of the step up-down converter 40 (step S140). Here, the target duty ratio D* of the step up-down converter 40 is a target value of the duty ratio D that is defined as a ratio of ON time of the transistor T31 (upper arm) to a sum of ON time of the transistor T31 and ON time of the transistor T32 (lower arm). A setting method for the target duty ratio D* of the step up-down converter 40 will be described later. When such control of the step up-down converter 40 is performed to turn off the transistor T31 and turn on the transistor T32, the charge of the capacitor 48 is consumed as loss in the reactor L and the transistor T32. When the transistor T31 is turned on and the transistor T32 is turned off the charge of the capacitor 46 is consumed as loss in the transistor T31 and the reactor L. Thus, the charge of the capacitors 46, 48 can be discharged.

Next, the voltage VH of the capacitor 46 (high-voltage system electric power line 42*a*) from the voltage sensor 46*a*, and the voltage VL of the capacitor 48 (low-voltage system electric power line 42*b*) from the voltage sensor 48*a* are input (step S150). The input voltages VH, VL of the capacitors 46, 48 are compared with a threshold value Vref (step S160). Here, the threshold value Vref is a threshold value used for determining whether or not discharge of the capacitors 46, 48 may be terminated. For example, the threshold value Vref may take values such as 50 V, 60 V, and 0.70 V.

At step S160, when at least one of the voltages VH, VL of the capacitors 46, 48 is larger than the threshold value Vref, the processing returns to step S120. Then, the processing of steps S120 to S160 is repeatedly executed. When both the voltages VH, VL of the capacitors 46, 48 reach the threshold value Vref or below at step S160, it is determined that discharge of the capacitors 46, 48 may be terminated, and the present routine is ended.

Figure 3:
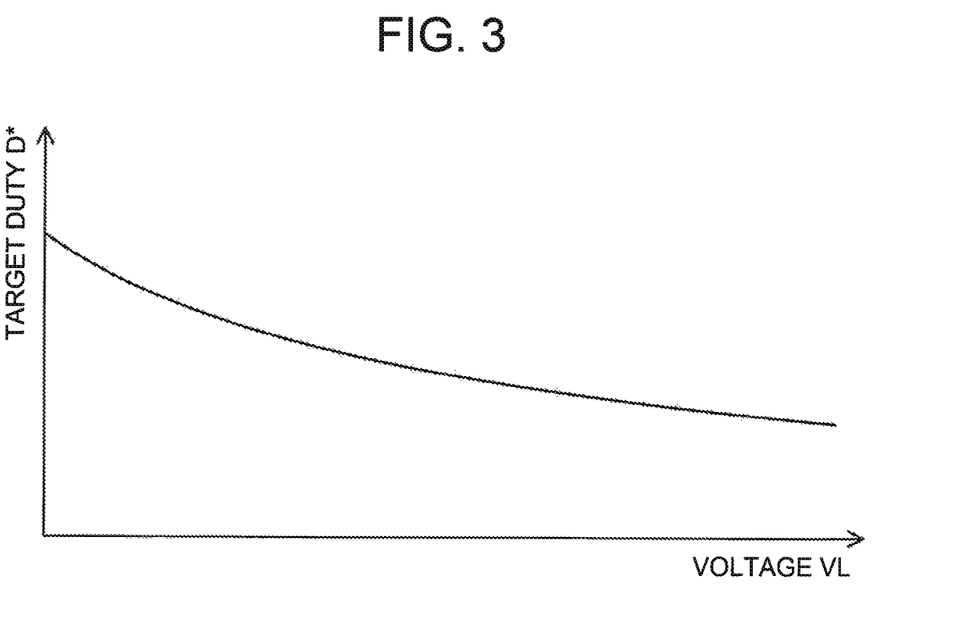
FIG. 3 is an explanatory view illustrating one example of a relation (first relation) between a voltage VL of a low-voltage system electric power line 42b and a target duty ratio D* of a step up-down converter 40 that maximizes a total loss Lsum.

Here, a description is given of the setting method for the target duty ratio D* of the step up-down converter 40 in the processing of step S130. In the embodiment, the target duty ratio D* of the step up-down converter 40 is set by applying the voltage VL of the low-voltage system electric power line 42*b* to a first relation between the voltage VL of the low-voltage system electric power line 42*b* and the target duty ratio D* of the step up-down converter 40. Here, the first relation is a relation between the voltage VL of the low-voltage system electric power line 42*b* and the target duty ratio D* of the step up-down converter 40 that maximizes the total loss Lsum. The first relation is predefined by an experiment or analysis, and is stored in the ROM 74. The total loss Lsum is the sum of the loss Lco of the step up-down converter 40 and the loss Ldc of the DC-DC converter 54 generated when the DC-DC converter 54 performs the second electric power supply. One example of the first relation is illustrated in FIG. 3. In the embodiment, the target duty ratio D* of the step up-down converter 40 is set using the first relation in FIG. 3, and the step up-down converter 40 is controlled. This makes it possible to maximize the total loss Lsum when the charge of the capacitors 46, 48 is discharged. As a result, the time taken for discharging the capacitors 46, 48 (time until both the voltages VH, VL of the capacitors 46, 48 reach the threshold value Vref or below) can be shortened more.

Figure 4:
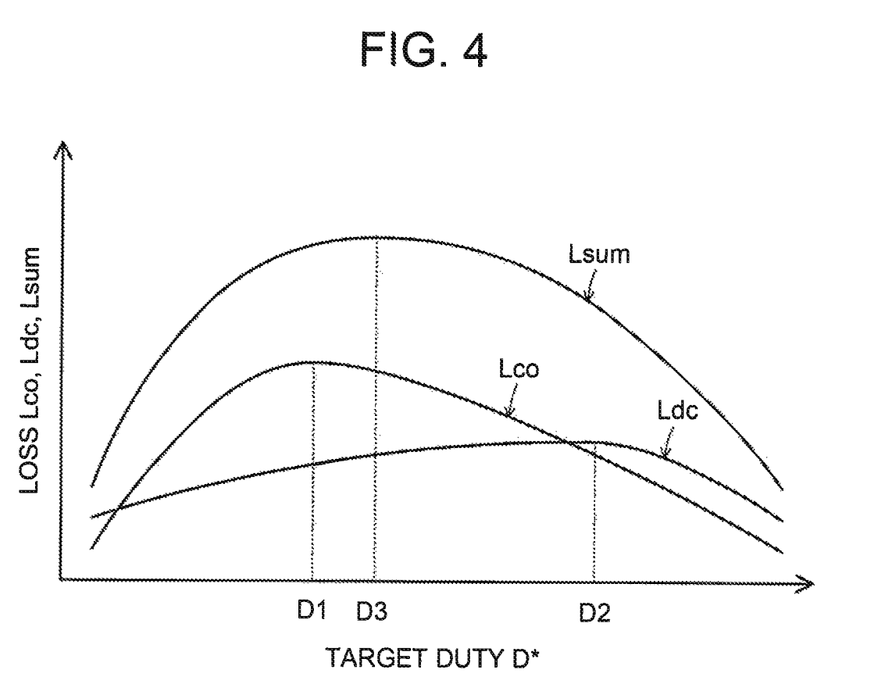
FIG. 4 is an explanatory view illustrating one example of a relation between the target duty ratio D* of the step up-down converter 40 and each of losses Lco, Ldc and Lsum when the voltage VL of the low-voltage system electric power line 42b takes a given value VL1.

For example, the first relation of FIG. 3 may be defined as below. FIG. 4 is an explanatory view illustrating one example of a relation between the target duty ratio D* of the step up-down converter 40 and each of the losses Lco, Ldc and Lsum when the voltage VL of the low-voltage system electric power line 42b takes a given value VL1. In the drawing, "D1", "D2", and "D3" represent values of the target duty ratio D* of the step up-down converter 40 that maximize the losses Lco, Ldc, and Lsum when the voltage VL of the low-voltage system electric power line 42b takes a value VL1, respectively. The relation of FIG. 4 can be obtained by an experiment or analysis in advance. Thus, the target duty ratio D* (value D3) of the step up-down converter 40 that maximizes the total loss Lsum when the voltage VL of the low-voltage system electric power line 42b is value VL1 is set. Similarly, the target duty ratio D* of the step up-down converter 40 that maximizes the total loss Lsum when the voltage VL of the low-voltage system electric power line 42b takes each value is set. By accumulating these values, the first relation of FIG. 3 can be defined.

In the electric vehicle 20 of the embodiment described in the foregoing, when a collision of the vehicle is detected, and so the system main relay SMR is turned off to discharge the charge of the capacitors 46, 48, the second electric power supply by the DC-DC converter 54 is performed, while the target duty ratio D* of the step up-down converter 40 is set to maximize the total loss Lsum, and the step up-down converter 40 is controlled. Accordingly, the time taken for discharging the charge of the capacitors 46, 48 (time until both the voltages VH, VL of the capacitors 46, 48 reach the threshold value Vref or below) can be shortened more. Even when it becomes impossible to supply the electric power for operation from the auxiliary battery 50 to the electronic control unit 70, the electric power for operation can be supplied to the electronic control unit 70 from the high-voltage system electric power line 42a through the DC-DC converter 54. This makes it possible to secure an operation state of the electronic control unit 70, and to discharge the charge of the capacitors 46, 48.

In the electric vehicle 20 of the embodiment, when the system main relay SMR is turned off to discharge the charge of the capacitors 46, 48, the target duty ratio D* of the step up-down converter 40 is set by applying the voltage VL of the low-voltage system electric power line 42b to the first relation between the voltage VL of the low-voltage system electric power line 42b and the target duty ratio D* of the step up-down converter 40 that maximizes the total loss Lsum, and the step up-down converter 40 is controlled using the set target duty ratio D*. However, without being restricted thereto, the first relation may be a relation between the voltage VL of the low-voltage system electric power line 42b and the target duty ratio D* of the step up-down converter 40 in a first specified range where the total loss Lsum becomes a maximum or an approximation thereof (becomes larger than a maximum value of the loss of the step up-down converter 40).

Figure 5:
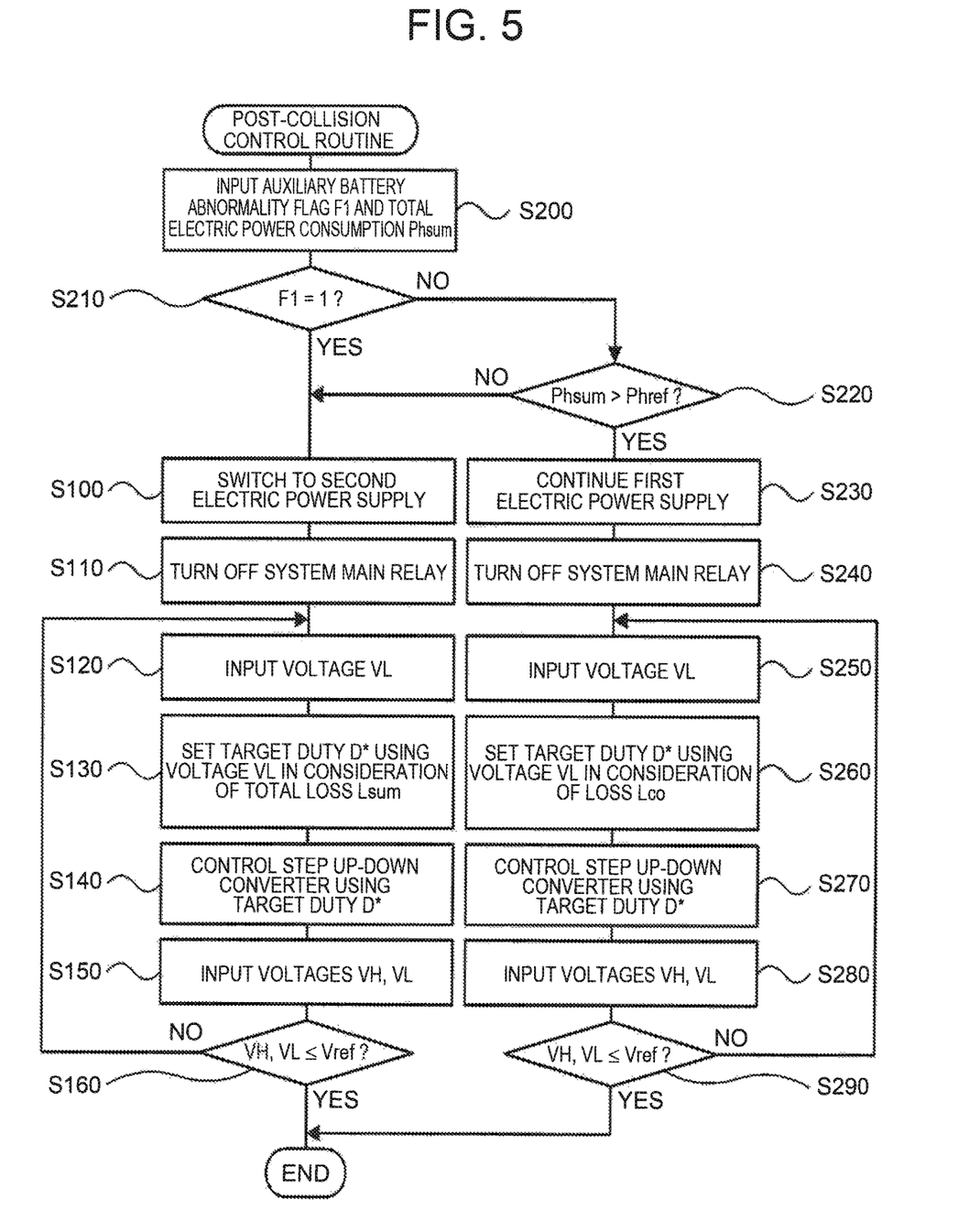
FIG. 5 is a flowchart illustrating one example of a post-collision control routine in a modification.

In the electric vehicle 20 of the embodiment, the electronic control unit 70 executes the post-collision control routine of FIG. 2, when a collision of the vehicle is detected. However, a post-collision control routine of FIG. 5 may be executed instead. The post-collision control routine of FIG. 5 is similar to the post-collision control routine of FIG. 2 except for the point that steps S200 to S290 are added. Therefore, like processing is designated by like step number, and a detailed description thereof is omitted.

When the post-collision control routine of FIG. 5 is executed, the electronic control unit 70 inputs data such as an auxiliary battery abnormality flag F1, and a total electric power consumption Phsum of the plurality of auxiliary machines 52 (step S200). Here, the auxiliary battery abnormality flag F1 is set to a value 0 when the auxiliary battery 50 is normal (electric power for operation is suppliable from the auxiliary battery 50 to the electronic control unit 70) based on an abnormality determination routine which is not illustrated. A value 1 is set and input in the auxiliary battery abnormality flag F1 when abnormality occurs in the auxiliary battery 50 (electric power for operation is not suppliable from the auxiliary battery 50 to the electronic control unit 70). Examples of the abnormality of the auxiliary battery 50 may include an abnormality where the voltage Vhb of the auxiliary battery 50 detected by the voltage sensor 50a becomes less than a threshold value Vhbref (for example, a value several V lower than the rated voltage of the auxiliary battery 50). As the total electric power consumption Phsum of the plurality of auxiliary machines 52, a value calculated as a sum total of the power consumption of the respective auxiliary machines 52 is input.

When the data is input in this way, the value of the input auxiliary battery abnormality flag F1 is checked (step S210). When the auxiliary battery abnormality flag F1 is equal to the value 1, it is determined that abnormality occurs in the auxiliary battery 50 (electric power for operation is not suppliable from the auxiliary battery 50 to the electronic control unit 70), and the processing subsequent to step S100 is executed. In this case, the effect same as that of the embodiment can be demonstrated.

When the auxiliary battery abnormality flag F1 is equal to the value 0 at step S210, it is determined that the auxiliary battery 50 is normal (electric power for operation is suppliable from the auxiliary battery 50 to the electronic control unit 70), and the total electric power consumption Phsum of the plurality of auxiliary machines 52 is compared with a threshold value Phref (step S220). Here, the threshold value Phref is a threshold value used for determining whether or not the total electric power consumption Phsum of the plurality of auxiliary machines 52 is relatively large. The significance of the processing of step S220 will be described later.

When the total electric power consumption Phsum of the plurality of auxiliary machines 52 is equal to or below the threshold value Phref at step S220, it is determined that the total electric power consumption Phsum of the auxiliary machine 52 is not so large, and the processing subsequent to step S100 is executed. The effect same as that of the embodiment can also be demonstrated in this case.

When the total electric power consumption Phsum of the plurality of auxiliary machines 52 is larger than the threshold value Phref at step S220, it is determined that the total electric power consumption Phsum of the plurality of auxiliary machines 52 is relatively large. Accordingly, electric power supply by the DC-DC converter 54 is not switched to the second electric power supply but the first electric power supply is maintained (step S230), and the system main relay SMR is turned off (step S240).

Next, the voltage VL of the capacitor 48 (low-voltage system electric power line 42b) is input (step S250). Based on the input voltage VL of the low-voltage system electric power line 42b, the target duty ratio D* of the step up-down converter 40 is set in consideration of the loss Lco of the step up-down converter 40 (step S260). Using the set target duty ratio D* of the step up-down converter 40, switching of the transistors T31, T32 of the step up-down converter 40 is controlled (step S270). Next, the voltages VH, VL of the capacitors 46, 48 are input (step S280). The input voltages VH, VL of the capacitors 46, 48 are compared with the threshold value Vref (step S290). When at least one of the voltages VH, VL of the capacitors 46, 48 is larger than the threshold value Vref, the processing returns to step S250. Then, the processing of steps S250 to S290 is repeatedly executed, and when both the voltages VH, VL of the capacitors 46, 48 reach the threshold value Vref or below at step S290, the present routine is ended.

Figure 6:
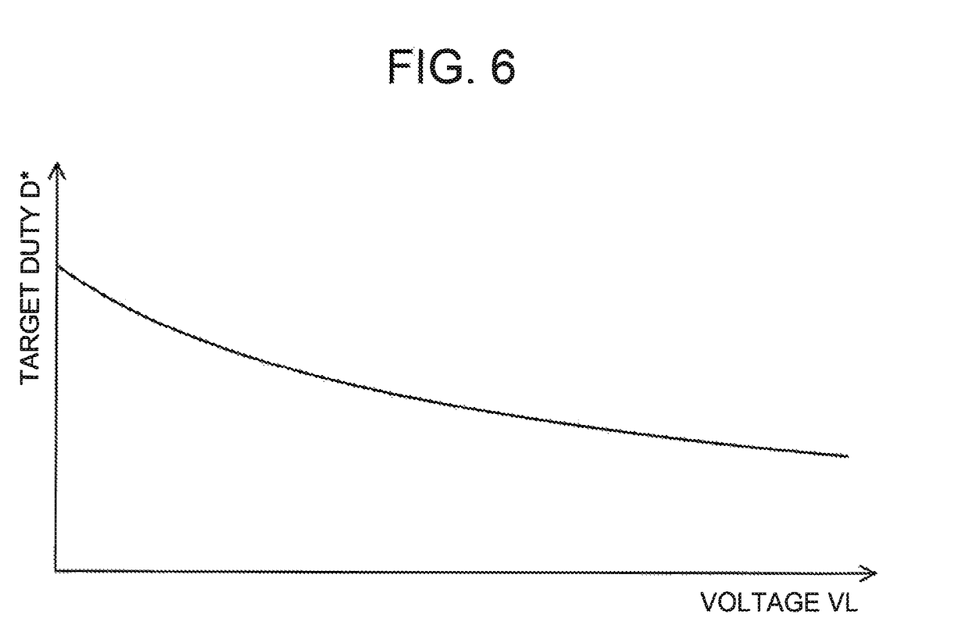
FIG. 6 is an explanatory view illustrating one example of a relation (second relation) between the voltage VL of the low-voltage system electric power line 42b and the target duty ratio D* of the step up-down converter 40 that maximizes the loss Lco of the step up-down converter 40.

Here, a description is given of the setting method for the target duty ratio D* of the step up-down converter 40 in the processing of step S260. The target duty ratio D* of the step up-down converter 40 in this case is set by applying the voltage VL of the low-voltage system electric power line 42b to a second relation between the voltage VL of the low-voltage system electric power line 42b and the target duty ratio D* of the step up-down converter 40. Here, the second relation is a relation between the voltage VL of the low-voltage system electric power line 42b and the target duties D* of the step up-down converter 40 that maximizes the loss Lco of the step up-down converter 40. The second relation is predefined by an experiment or analysis, and is stored in the ROM 74. One example of the second relation is illustrated in FIG. 6. When the DC-DC converter 54 performs the first electric power supply, the target duty ratio D* of the step up-down converter 40 is set using the second relation of FIG. 6, and the step up-down converter 40 is controlled. This makes it possible to maximize the loss Lco of the step up-down converter 40 when the charge of the capacitors 46, 48 is discharged. As a result, even when the DC-DC converter 54 performs (continues) the first electric power supply, the time taken for discharging the charge of the capacitors 46, 48 can be shortened. When the DC-DC converter 54 performs the first electric power supply, changes of the loss Ldc of the DC-DC converter 54 due to the target duty ratio D* of the step up-down converter 40 are considered to be small. This is considered to be because variations of the voltage VL of the low-voltage system electric power line 42b are small as compared with variations of the voltage VH of the high-voltage system electric power line 42a. Based on this assumption, when the DC-DC converter 54 performs the first electric power supply, the target duty ratio D* of the step up-down converter 40 is set not with the first relation but with the second relation in this modification.

For example, the second relation of FIG. 6 may be defined as below. Using the relation of FIG. 4, the target duty ratio D* (value D1) of the step up-down converter 40 that maximizes the loss Lco of the step up-down converter 40 when the voltage VL of the low-voltage system electric power line 42b is value VL1 is set. Similarly, the target duty ratio D* of the step up-down converter 40 that maximizes the loss Lco of the step up-down converter 40 when the voltage VL of the low-voltage system electric power line 42b takes each value is set. By accumulating these values, the second relation of FIG. 6 can be defined.

A description is now given of the significance of the processing of step S220, i.e., the processing of comparing the total electric power consumption Phsum of the plurality of auxiliary machines 52 with the threshold value Phref. The processing is performed in order to predict which control to execute, the first discharge control or the second discharge control. That is, the processing is performed in order to predict whether the time taken for discharging the capacitors 46, 48 can be shortened more. Here, the first discharge control is configured to perform the second electric power supply by the DC-DC converter 54 while setting the target duty ratio D* of the step up-down converter 40 to maximize the total loss Lsum and controlling the step up-down converter 40 (steps S100 to S160). The second discharge control is configured to perform the first electric power supply by the DC-DC converter 54 while setting the target duty ratio D* of the step up-down converter 40 to maximize the loss Lco of the step up-down converter 40 and controlling the step up-down converter 40 by (steps S230 to S290). When the total electric power consumption Phsum of the plurality of auxiliary machines 52 is relatively large, it is necessary to supply relatively large electric power to the auxiliary-system electric power line 42c with the DC-DC converter 54. Accordingly, when the second discharge control is executed, the time taken for discharging the capacitors 46, 48 can be shortened more than when the first discharge control is executed. When the total electric power consumption Phsum of the plurality of auxiliary machines 52 is not so large, it is not necessary to supply such large electric power to the auxiliary-system electric power line 42c with the DC-DC converter 54. Accordingly, when the first discharge control is executed, the time taken for discharging the capacitors 46, 48 can be shortened more than when the second discharge control is executed. Therefore, when the total electric power consumption Phsum of the plurality of auxiliary machines 52 is compared with the threshold value Phref, and the first discharge control or the second discharge control is performed, the time taken for discharging the capacitors 46, 48 can be shortened more.

In this modification, in the case of turning off the system main relay SMR to discharge the charge of the capacitors 46, 48, the first discharge control is executed when abnormality occurs in the auxiliary battery 50, or when the auxiliary battery 50 is normal and the total electric power consumption Phsum of the plurality of auxiliary machines 52 is equal to or below the threshold value Phref, whereas the second discharge control is executed when the auxiliary battery 50 is normal and the total electric power consumption Phsum of the plurality of auxiliary machines 52 is larger than the threshold value Phref. However, when the auxiliary battery 50 is normal, the second discharge control may be executed irrespective of the total electric power consumption Phsum of the plurality of auxiliary machines 52. That is, the processing of step S220 in the post-collision control routine of FIG. 5 may be skipped.

In this modification, when the second discharge control is executed, the target duty ratio D* of the step up-down converter 40 is set by applying the voltage VL of the low-voltage system electric power line 42b to the second relation between the voltage VL of the low-voltage system electric power line 42b and the target duty ratio D* of the step up-down converter 40 that maximizes the loss Lco of the step up-down converter 40, and the step up-down converter 40 is controlled using the set target duty ratio D*. However, without being restricted to the relation disclosed, the second relation may be a relation between the voltage VL of the low-voltage system electric power line 42b and the target duty ratio D* of the step up-down converter 40 in a second specified range where the loss Lco of the step up-down converter 40 becomes a maximum or an approximation thereof.

Figure 7:
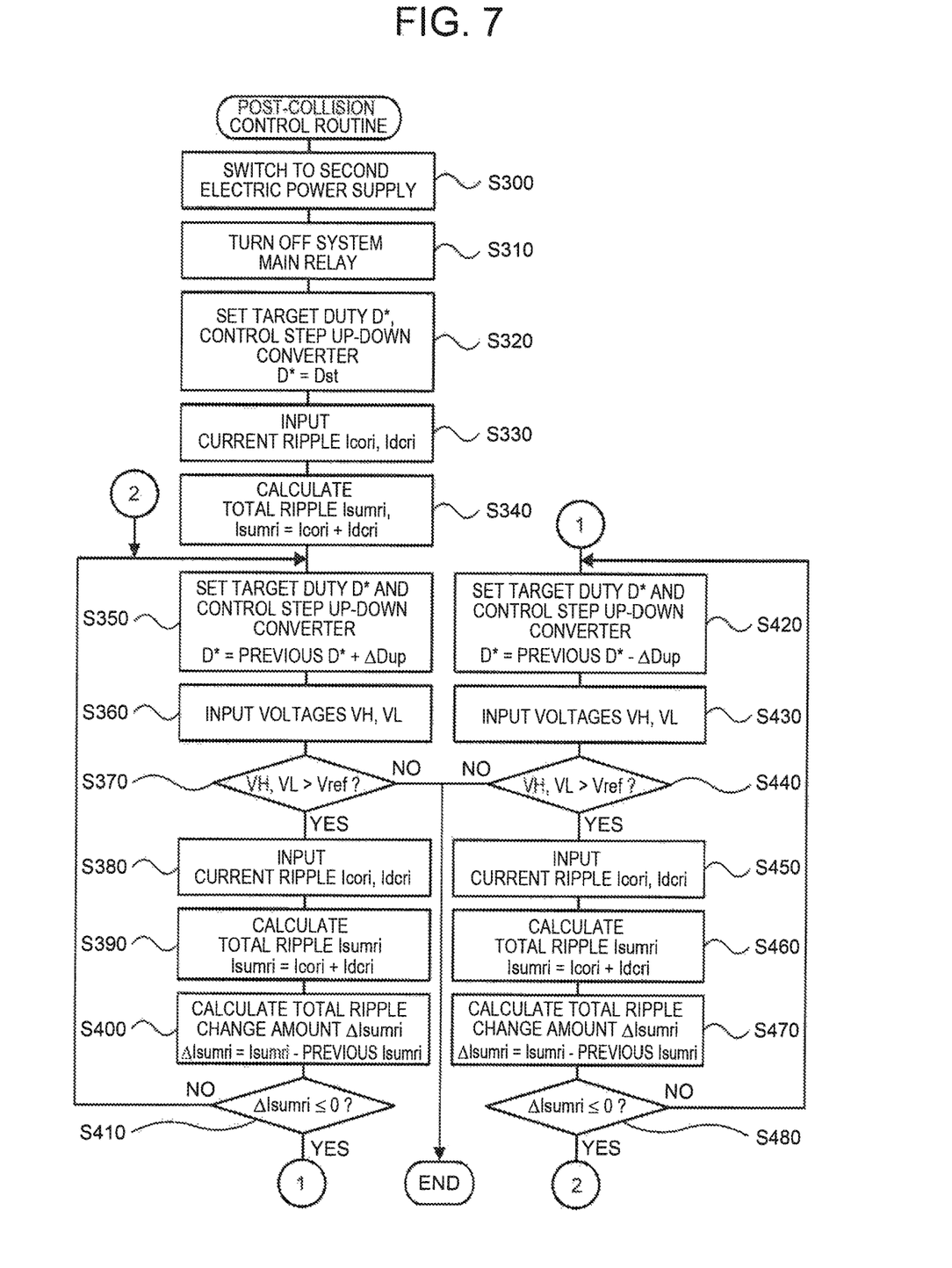
FIG. 7 is a flowchart illustrating one example of a post-collision control routine in the modification.

In the electric vehicle 20 of the embodiment, the electronic control unit 70 executes the post-collision control routine of FIG. 2, when a collision of the vehicle is detected. However, a post-collision control routine of FIG. 7 may be executed instead. When the post-collision control routine of FIG. 7 is executed, the electronic control unit 70 switches electric power supply by the DC-DC converter 54 from the first electric power supply to the second electric power supply (step S300), and turns off the system main relay SMR (step S310). Next, the target duty ratio D* of the step up-down converter 40 is set to a specified value Dst as an initial value, and the step up-down converter 40 is controlled (step S320). Here, the specified value Dst may take values such as 0.45, 0.50, and 0.55.

Then, a current ripple Icori of the step up-down converter 40 and a current ripple Idcri of the DC-DC converter 54 when the step up-down converter 40 is controlled are input (step S330). As the sum of the input current ripples Icori, Idcri, a total ripple Isumri is calculated (step S340). Here, input as the current ripple Icori of the step up-down converter 40 is a value calculated as a ripple component of the electric current IL of the reactor L in the step up-down converter 40 detected by the current sensor 40a. Input as the current ripple Idcri of the DC-DC converter 54 is a value calculated as a ripple component of the electric current Idc of the DC-DC converter 54 detected by the current sensor 54a. The total ripple Isumri can be considered as an equivalence of the total loss Lsum.

Next, a value obtained by adding a specified value ΔDup to a previous target duty ratio (previous D*) of the step up-down converter 40 is set as a new target duty ratio D*, and the step up-down converter 40 is controlled (step S350). Here, the specified 26 value ΔDup is an increment for increasing the target duty ratio D*. The specified value ΔDup may take values such as 0.01, 0.02, and 0.03.

Next, the voltages VH, VL of the capacitors 46, 48 are input (step S360), and the voltages VH, VL of the input capacitors 46, 48 are compared with the threshold value Vref (step S370). When at least one of the voltages VH, VL of the capacitors 46, 48 is larger than the threshold value Vref, the current ripple Icori of the step up-down converter 40 and current ripple Idcri of the DC-DC converter 54 when the step up-down converter 40 is controlled are input (step S380). As the sum of the input current ripples Icori, Idcri, the total ripple Isumri is calculated (step S390). Next, a total ripple change 6 amount ΔIsumri is calculated by subtracting the previous total ripple (previous Isumri) from the calculated total ripple Isumri (step S400), and the calculated total ripple change amount ΔIsumri is compared with a value 0 (step S410). When the total ripple change amount ΔIsumri is a positive value, it is determined that the total ripple Isumri is increased by increasing the target duty ratio D* of the step up-down converter 40, and the processing returns to step S350. Thus, when the total ripple Isumri increases by increasing the target duty ratio D* of the step up-down converter 40, the target duty ratio D* is further increased.

When the total ripple change amount ΔIsumri is a value 0 or below at step S410, it is determined that the total ripple Isumri is unchanged or decreased by increasing the target duty ratio D* of the step up-down converter 40. Accordingly, a value obtained by subtracting a specified value ΔDdn from the previous target duty ratio (previous D*) of the step up-down converter 40 is set as a new target duty ratio D*, and the step up-down converter 40 is controlled (step S420). Here, the specified value ΔDdn is a decrement for decreasing the target duty ratio D*. The specified value ΔDdn may take values such as 0.01, 0.02, and 0.03.

Next, the voltages VH, VL of the capacitors 46, 48 are input (step S430), and the voltages VH, VL of the input capacitors 46, 48 are compared with the threshold value Vref (step S440). When at least one of the voltages VH, VL of the capacitors 46, 48 is larger than the threshold value Vref, the current ripple Icori of the step up-down converter 40 and the current ripple Idcri of the DC-DC converter 54 when the step up-down converter 40 is controlled are input (step S450). As the sum of the input current ripples Icori, Idcri, the total ripple Isumri is calculated (step S460). Next, the total ripple change amount ΔIsumri is calculated by subtracting the previous total ripple (previous Isumri) from the calculated total ripple Isumri (step S470), and the calculated total ripple change amount ΔIsumri is compared with a value 0 (step S480). When the total ripple change amount ΔIsumri is a positive value, it is determined that the total ripple Isumri is increased by decreasing the target duty ratio D* of the step up-down converter 40, and the processing returns to step S420. Thus, when the total ripple Isumri increases by decreasing the target duty ratio D* of the step up-down converter 40, the target duty ratio D* is further decreased.

When the total ripple change amount ΔIsumri is a value 0 or below at step S480, it is determined that the total ripple Isumri is unchanged or decreased by decreasing the target duty ratio D* of the step up-down converter 40, and the processing shifts to step S350.

The present routine is ended when both the voltages VH, VL of the capacitors 46, 48 reach the threshold value Vref or below at step S370 or step S440 while the step up-down converter 40 is controlled by increasing or decreasing the target duty ratio D* of the step up-down converter 40 in this way. Thus, the step up-down converter 40 is controlled by increasing or decreasing the target duty ratio D* of the step up-down converter 40 such that the total ripple Isumri becomes larger (approximates to a maximum). As a result, the time taken for discharging the charge of the capacitors 46, 48 can be shortened more.

In this modification, in the case of turning off the system main relay SMR to discharge the charge of the capacitors 46, 48, the step up-down converter 40 is controlled by increasing or decreasing the target duty ratio D* of the step up-down converter 40 such that the total ripple Isumri becomes larger (approximates to the maximum). However, when the auxiliary battery 50 is normal, the step up-down converter 40 may be controlled by increasing or decreasing the target duty ratio D* of the step up-down converter 40 such that the current ripple Icori of the step up-down converter 40 becomes larger (approximates to the maximum). When the auxiliary battery 50 is normal and the total electric power consumption Phsum of the plurality of auxiliary machines 52 is equal to or below the threshold value Phref, the step up-down converter 40 is controlled by increasing or decreasing the target duty ratio D* of the step up-down converter 40 such that the total ripple Isumri becomes larger. When the total electric power consumption Phsum of the plurality of auxiliary machines 52 is larger than the threshold value Phref, the step up-down converter 40 may be controlled by increasing or decreasing the target duty ratio D* of the step up-down converter 40 such that the current ripple Icori of the step up-down converter 40 becomes larger.

Although not specifically described in the electric vehicle 20 of the embodiment, in the case of turning off the system main relay SMR to discharge the charge of the capacitors 46, 48, when abnormality does not occur in the motor 32 and the inverter 34, not only the aforementioned post-collision control routine is executed, but also the inverter 34 may be controlled such that a d-axis current flows into the motor 32 and is consumed as loss.

Although the main battery 36 is used as the first electric storage device in the electric vehicle 20 of the embodiment, a capacitor may be used instead.

In the embodiment, the electric vehicle 20 is configured such that the driving shaft 26 coupled with the driving wheels 22a, 22b is connected to the motor 32 so that electric power is exchanged between the motor 32 and the main battery 36. However, a hybrid vehicle may be configured such that not only a driving shaft coupled with driving wheels is connected to a motor but also the driving shaft is connected to an engine and a power generator through a planetary gear, so that electric power is exchanged between the motor or the power generator and the main battery. A so-called series-type hybrid vehicle may also be configured such that not only a driving shaft coupled with driving wheels is connected to a motor but also an output shaft of an engine is connected to a power generator, so that electric power is exchanged between the motor or the power generator and the main battery. Furthermore, a hybrid vehicle may be configured such that a driving shaft coupled with driving wheels is connected to a motor through a transmission, and the motor is connected to an engine through a clutch, so that electric power is exchanged between the motor and the main battery.

The present disclosure is embodied as the electric vehicle 20 or the hybrid vehicles in the embodiments or the modifications. However, the present disclosure may be embodied as a drive unit incorporated therein and as a drive unit built into unmoving facilities such as construction facilities. The present disclosure may be embodied as other moving means, such as two-wheeled vehicles, boats, and airplanes, and as a drive unit built therein.

A description is given of correspondence relation between main elements of the embodiments and main elements of the present disclosure described in SUMMARY. In the embodiments, the motor 32 is one example of "motor", the inverter 34 is one example of "inverter." The main battery 36 is one example of "first electric storage device", and the step up-down converter 40 is one example of "step up-down converter." The capacitor 46 is one example of "first capacitor", and the capacitor 48 is one example of "second capacitor." The DC-DC converter 54 is one example of "DC-DC converter", the system main relay SMR is one example of "relay", and the electronic control unit 70 is one example of "electronic control unit."

Since the correspondence relation between the main elements of the embodiments and the main elements of the present disclosure described in SUMMARY is one example to provide a specific description of the modes for carrying out the present disclosure described in SUMMARY, the correspondence relation is not intended to limit the elements of the disclosure described in SUMMARY. More specifically, the disclosure disclosed in SUMMARY should be interpreted based on the description therein, and the embodiments are merely specific examples of the disclosure disclosed in SUMMARY.

Although the modes for carrying out the present disclosure have been described using the embodiments, the present disclosure is not limited in any manner to the embodiments disclosed. It should naturally be understood that the present disclosure can be carried out in various modes without departing from the scope of the present disclosure.

The present disclosure is applicable in the fields such as manufacturing of drive units and vehicles.

What is claimed is:

1. A drive unit, comprising:
    a motor;
    an inverter that drives the motor,
    a first electric storage device;
    a step up-down converter having a switching element and a reactor, the step up-down converter being connected to a first electric power line and a second electric power line, the first electric power line being connected to the inverter, the second electric power line being connected to the first electric storage device, the step up-down converter being configured to exchange electric power between the second electric power line and the first electric power line while converting voltage of the electric power;
    a first capacitor attached to the first electric power line;
    a second capacitor attached to the second electric power line;
    a DC-DC converter connected to the first electric power line;
    a relay provided in a portion of the second electric power line closer to the first electric storage device than the second capacitor; and
    an electronic control unit configured to control the step up-down converter and the DC-DC converter, wherein
    the electronic control unit is configured to execute a first discharge control when the relay is turned off to discharge charge of the first capacitor and the second capacitor, the first discharge control being a control to drive the DC-DC converter, while setting a target duty ratio of the step up-down converter such that a total loss of the step up-down converter and the DC-DC converter becomes larger than a maximum loss value of the step up-down converter, and controlling the step up-down converter.

2. The drive unit according to claim 1, wherein the electronic control unit is configured to set the target duty ratio such that the total loss is maximized when the first discharge control is executed.

3. The drive unit according to claim 1, further comprising a second electric storage device having a rated voltage lower than that of the first electric storage device, the second electric storage device being capable of supplying electric power for operation to the electronic control unit, wherein
    the DC-DC converter is configured to step down voltage of electric power of the first electric power line and supply the electric power to the electronic control unit as the electric power for operation, and
    the electronic control unit is configured to execute the first discharge control irrespective of whether or not the electric power for operation from the second electric storage device to the electronic control unit is suppliable, when the relay is turned off to discharge the charge of the first capacitor and the second capacitor.

4. The drive unit according to claim 1, further comprising a second electric storage device having a rated voltage lower than that of the first electric storage device, the second electric storage device being configured to supply electric power for operation to the electronic control unit, wherein the DC-DC converter is configured to step down voltage of electric power of the first electric power line and supply the electric power to the electronic control unit as the electric power for operation, the electronic control unit executes the first discharge control when following conditions i) and ii) are both satisfied, i) the relay is turned off to discharge the charge of the first capacitor and the second capacitor, and ii) the electronic control unit determines that the electric power for operation from the second electric storage device to the electronic control unit is not suppliable, and the electronic control unit is configured to execute second discharge control when following conditions i) and iii) are both satisfied, i) the relay is turned off to discharge the charge of the first capacitor and the second capacitor and iii) the electronic control unit determines that the electric power for operation from the second electric storage device to the electronic control unit is suppliable, the second discharge control being a control to set the target duty ratio based on the loss of the step up-down converter and control the step up-down converter.

5. The drive unit according to claim 4, wherein
the electronic control unit is configured to determine that the electric power for operation from the second electric storage device to the electronic control unit is not suppliable when following conditions i) and iv) are both satisfied, i) the relay is turned off to discharge the charge of the first capacitor and the second capacitor, and iv) the electronic control unit determines that abnormality occurs in the second electric storage device.

6. The drive unit according to claim 4, wherein
the electronic control unit is configured to set the target duty ratio such that the loss of the step up-down converter is maximized when the second discharge control is executed.

7. The drive unit according to claim 4, wherein
the DC-DC converter is configured to switch first electric power supply and second electric power supply, the first electric power supply being configured to step down voltage of electric power of the second electric power line and supply the electric power to a third electric power line connected to the second electric storage device, the electronic control unit, and a plurality of auxiliary machines, the second electric power supply being configured to step down voltage of electric power of the first electric power line and supply the electric power to the electronic control unit as the electric power for operation, the electronic control unit executes the second electric power supply with the DC-DC converter when executing the first discharge control, the electronic control unit executes the first electric power supply with the DC-DC converter when executing the second discharge control, the electronic control unit is configured to execute the first discharge control when following conditions i), v), and vi) are all satisfied, i) the relay is turned off to discharge the charge of the first capacitor and the second capacitor, v) the electronic control unit determines that electric power from the second electric storage device to the electronic control unit is suppliable, and vi) total electric power consumption of the plurality of auxiliary machines is equal to or below a threshold value, and the electronic control unit is configured to execute the second discharge control when following conditions i), v), and vii) are all satisfied, i) the relay is turned off to discharge the charge of the first capacitor and the second capacitor, v) the electronic control unit determines that electric power from the second electric storage device to the electronic control unit is suppliable, and vii) the total electric power consumption of the plurality of auxiliary machines is larger than the threshold value.

8. The drive unit according to claim 1, wherein
the electronic control unit is configured to store a predetermined relation between voltage of the second electric power line and the target duty ratio that maximizes the total loss, and the electronic control unit is configured to set the target duty ratio by applying the voltage of the second electric power line to the relation when the first discharge control is executed.

9. The drive unit according to claim 1, wherein
the electronic control unit is configured to define a total ripple of a current ripple of the step up-down converter and a current ripple of the DC-DC converter as the total loss, and set the target duty ratio such that the total loss approximates to the maximum, when the first discharge control is executed.

10. A vehicle, comprising:
a motor;
an inverter that drives the motor;
a first electric storage device;
a step up-down converter having a switching element and a reactor, the step up-down converter being connected to a first electric power line and a second electric power line, the first electric power line being connected to the inverter, the second electric power line being connected to the first electric storage device, the step up-down converter being configured to exchange electric power between the second electric power line and the first electric power line while converting voltage of the electric power,
a first capacitor attached to the first electric power line;
a second capacitor attached to the second electric power line;
a DC-DC converter connected to the first electric power line;
a relay provided in a portion of the second electric power line closer to the first electric storage device than the second capacitor; and
an electronic control unit configured to control the step up-down converter and the DC-DC converter, wherein
the electronic control unit is configured to execute a first discharge control when the relay is turned off to discharge charge of the first capacitor and the second capacitor, the first discharge control being a control to drive the DC-DC converter, while setting a target duty ratio of the step up-down converter such that a total loss of the step up-down converter and the DC-DC converter becomes larger than a maximum loss value of the step up-down converter, and controlling the step up-down converter, and
the electronic control unit is configured to execute the first discharge control when detecting a collision of the vehicle.

11. A control method for a drive unit,
the drive units including: a motor; an inverter that drives the motor; a first electric storage device; a step up-down converter having a switching element and a reactor, the step up-down converter being connected to a first electric power line and a second electric power line, the first electric power line being connected to the inverter, the second electric power line being connected to the first electric storage device, the step up-down converter being configured to exchange electric power between the second electric power line and the first electric power line while converting voltage of the electric power, a first capacitor attached to the first electric power line; a second capacitor attached to the second electric power line; a DC-DC converter connected to the first electric power line; a relay provided in a portion of the second electric power line closer to the first electric storage device than the second capacitor, and an electronic control unit configured to control the step up-down converter and the DC-DC converter, the control method comprising:
executing, by the electronic control unit, a first discharge control when the relay is turned off to discharge charge of the first capacitor and the second capacitor, the first discharge control being a control to drive the DC-DC converter with the electronic control unit, while setting a target duty ratio of the step up-down converter such that a total loss of the step up-down converter and the DC-DC converter becomes larger than a maximum loss value of the step up-down converter, and controlling the step up-down converter.

* * * * *